O. O. Witherell,
Chain Pump.

N° 83,117.   Patented Oct. 13, 1868.

Witnesses:   Inventor:

UNITED STATES PATENT OFFICE.

ORIN O. WITHERELL, OF LEWISTON, MAINE.

IMPROVEMENT IN CHAIN-PUMP VALVES.

Specification forming part of Letters Patent No. 83,117, dated October 13, 1868.

*To all whom it may concern:*

Be it known that I, ORIN O. WITHERELL, of Lewiston, in the county of Androscoggin and State of Maine, have invented a new and useful Improvement in Buckets for Chain-Pumps; and I do hereby declare that the following is a full, clear, and exact description thereof, which will enable others skilled in the art to make and use the same, reference being had to the accompanying drawings, forming part of this specification.

Figure 1:
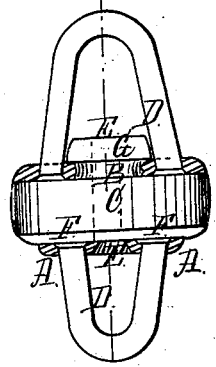
Figure 2:
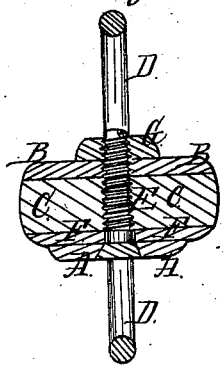

Figure 1 represents a side view, partly in section, of my improved chain-pump bucket. Fig. 2 is a vertical central section of the same, taken on the plane of the line $x\,x$, Fig. 1.

Similar letters of reference indicate corresponding parts.

This invention relates to an improvement on that class of chain-pump valves in which a rubber or other elastic plate or ring is clamped between two metal plates; and the invention consists in the use and arrangement of a screw by which the parts are held together. The screw is made of brass or other non-corrosive metal, and is fitted through the metal heads and through the rubber into a nut resting upon the opposite head. Both the screw and nut are entirely separated from the heads. The parts cannot be taken apart or work apart by twisting or turning the heads. Heretofore such screws were formed as part of the heads of the bucket, and, as the bucket is incessantly twisted during the operation, they could easily work loose. Moreover, the heads have to be made of iron, and, consequently, also the screw that forms part of the head. Such screw and nut would, by corrosion, soon be made perfectly useless, while the brass screw and nut will not corrode so quickly, and will therefore remain in good order for a long time.

A in the drawing represents one head, B the other, of a chain-pump valve or bucket. Each head is simply an iron plate with a hole through its center.

C represents a rubber or other elastic plate, perforated in the center. D D are the staples or links. The same are, with their ends, riveted to the respective heads, as is clearly shown in Fig. 1.

E represents a screw with a polygonal head, which screw is fitted through the heads A B, and through the elastic plate C, and has its head countersunk in the plate A. Between the plates A and C is interposed a washer, F, which, as the plate A revolves with the screw, prevents it from coming in contact with and rubbing on the elastic plate.

G is a nut, which rests upon the outside of the plate B, and retains the screw in position. By turning the nut or the screw the parts can be securely clamped together. The screw as well as the nut is made of brass or some other metal which does not easily corrode, while the plates A B F and the links are made of cast or other iron.

I claim as new and desire to secure by Letters Patent—

The plates A B, having the links D D secured upon the elastic plate C and washer F by means of the countersunk screw E extending centrally through the plate and washer, between the ends of the link, into a nut, G, between the ends of the link upon the plate B, as herein described and shown.

The above specification of my invention signed by me this 6th day of March, 1868.

ORIN O. WITHERELL.

Witnesses:
SHERBURN B. TITCOMB,
J. M. DAVIS.